(12) United States Patent
Chen et al.

(10) Patent No.: US 11,829,154 B1
(45) Date of Patent: Nov. 28, 2023

(54) SYSTEMS AND METHODS FOR ROBOTIC NAVIGATION, TEACHING AND MAPPING

(71) Applicant: Intelligent Cleaning Equipment Holdings Co. Ltd., Tortola (VG)

(72) Inventors: Simon Nai Pong Chen, Dongguan (CN); Pui Keung Lam, Dongguan (CN); Jiji Cao, Dongguan (CN); Dongkun Yan, Beijing (CN); Sheng Kang, Beijing (CN); Wen Jiang, Beijing (CN)

(73) Assignee: Intelligent Cleaning Equipment Holdings Co. Ltd., Tortola (VG)

( * ) Notice: Subject to any disclaimer, the term of this patent is extended or adjusted under 35 U.S.C. 154(b) by 0 days.

(21) Appl. No.: 18/126,682

(22) Filed: Mar. 27, 2023

Related U.S. Application Data

(63) Continuation of application No. PCT/CN2022/106182, filed on Jul. 18, 2022.

(51) Int. Cl.
*G05D 1/02* (2020.01)

(52) U.S. Cl.
CPC ......... *G05D 1/0268* (2013.01); *G05D 1/0214* (2013.01); *G05D 2201/0203* (2013.01)

(58) Field of Classification Search
CPC ............... G05D 1/0214; G05D 1/0268; G05D 2201/0203
See application file for complete search history.

(56) References Cited

U.S. PATENT DOCUMENTS

| | | |
|---|---|---|
| 6,667,592 B2 | 12/2003 | Jacobs et al. |
| 9,868,208 B2 | 1/2018 | Meier |
| 9,873,196 B2 | 1/2018 | Szatmary et al. |
| 10,213,921 B2 | 2/2019 | Meier |
| 10,241,514 B2 | 3/2019 | Passot et al. |
| 10,328,573 B2 | 6/2019 | Williams et al. |
| 10,545,074 B2 | 1/2020 | Meier |
| 10,807,230 B2 | 10/2020 | Szatmary et al. |
| 11,157,016 B2 | 10/2021 | Suvarna et al. |
| 2018/0210448 A1 | 7/2018 | Lee et al. |
| 2019/0171210 A1 | 6/2019 | Passot et al. |
| 2019/0212752 A1* | 7/2019 | Fong ............... G06V 10/82 |
| 2020/0150003 A1 | 5/2020 | Meier |
| 2020/0175640 A1 | 6/2020 | Meier et al. |
| 2020/0219267 A1* | 7/2020 | Rebecq ............... G06T 7/20 |
| 2021/0164785 A1* | 6/2021 | Dooley ............... G01S 1/70 |
| 2021/0192774 A1 | 6/2021 | Tsai et al. |

FOREIGN PATENT DOCUMENTS

| | | |
|---|---|---|
| CN | 110243360 A | 9/2019 |
| CN | 112004645 A | 11/2020 |
| CN | 112731923 A | 4/2021 |
| CN | 114442625 A | 5/2022 |
| WO | WO-2020176838 A1 | 9/2020 |

OTHER PUBLICATIONS

Collins, Toby; Bartoli, Adrien. "Infinitesimal Plane-based Pose Estimation". 2014 (Year: 2014).*
PCT/CN2022/106182 Search Report and Written Opinion dated Mar. 24, 2023.

* cited by examiner

*Primary Examiner* — Nicholas Kiswanto
(74) *Attorney, Agent, or Firm* — Wilson Sonsini Goodrich & Rosati

(57) ABSTRACT

The present disclosure provides systems and methods for robotic navigation, teaching, and mapping. In some cases, the robotic systems and methods may be used to clean an area or environment.

29 Claims, 16 Drawing Sheets

SYSTEMS AND METHODS FOR ROBOTIC NAVIGATION, TEACHING AND MAPPING

CROSS-REFERENCE

This application is a Continuation Application of International Application No. PCT/CN2022/106182, filed on Jul. 18, 2022, which application is incorporated herein by reference in its entirety for all purposes.

BACKGROUND

Robots and/or machines may be used to perform tasks, provide services, and navigate environments autonomously or semi-autonomously. Some robots or machines may be used to execute cleaning tasks in an environment in which the robot or machine is positioned or capable of navigating to or through with or without input or command by a human operator.

SUMMARY

The present disclosure relates generally to systems and methods for robotic navigation, teaching and mapping. The robotic systems may comprise robots or machines that are capable of cleaning, disinfecting, sanitizing, transporting items, inspecting, monitoring or conducting surveillance of an area or an environment. The robots or machines may be configured to operate autonomously or semi-autonomously to clean an area or environment.

In one aspect, a method of operating a robot is provided. The method may comprise: (a) determining a pose of the robot based at least in part on one or more images of one or more repositionable or movable initialization objects within an environment; (b) generating a map of the environment in which the robot is configured to move, wherein the map comprises information on (i) an area of the environment that the robot is configured to move in or traverse through to perform one or more tasks or operations, (ii) one or more predetermined paths for the robot to travel, and (iii) the pose of the robot, wherein the map and the one or more predetermined paths are associated with the repositionable or movable initialization objects; and (c) initiating a movement of the robot along at least a portion of the one or more predetermined paths to perform the one or more tasks or operations.

In another aspect, a method may comprise: (a) providing a robot comprising one or more sensors configured to detect one or more obstacles in or near an environment as the robot traverses or moves along one or more training trajectories through the environment, wherein the robot is configured to: (1) determine a cleaning area in the environment by (i) projecting the one or more training trajectories and sensor data obtained using the one or more sensors onto a map and (ii) expanding the one or more training trajectories based on a location of one or more unoccupied grids in the map, wherein the cleaning area comprises the one or more training trajectories and is free of the one or more obstacles detected using the one or more sensors; (2) identify one or more target areas to clean within the cleaning area based on a designation of one or more boundaries for the one or more target areas, wherein the one or more boundaries are recorded by the robot as the robot traverses or moves along the one or more boundaries; and (3) move or navigate along one or more cleaning paths through or within the one or more target areas to clean the one or more target areas or a portion thereof A further aspect is directed to a method comprising: (a) providing (i) a plurality of robots and (ii) one or more scannable objects associated with one or more maps of an environment; and (b) deploying the plurality of robots in the environment to perform one or more tasks, wherein the plurality of robots are configured to navigate through the environment using the one or more maps in order to perform the one or more tasks.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the various principles are utilized, and the accompanying drawings (also "Figure" and "FIG." herein), of which:

DETAILED DESCRIPTION

Figure 1:
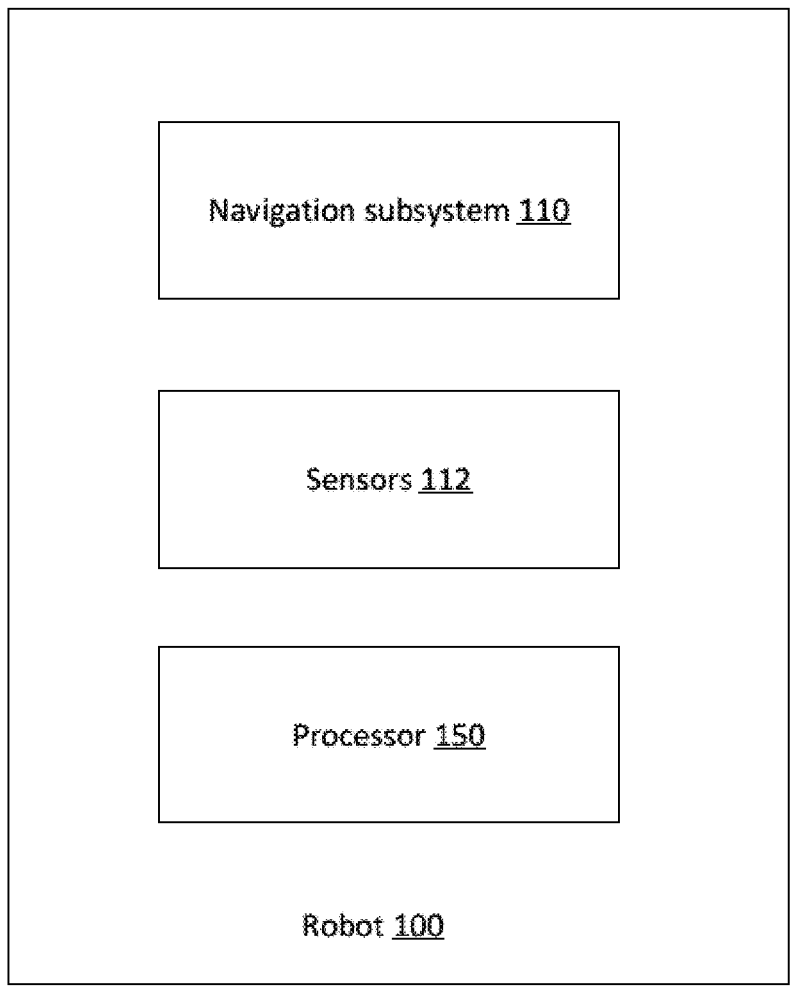
FIG. 1 schematically illustrates a robot, in accordance with some embodiments.

While various embodiments have been shown and described herein, it will be obvious to those skilled in the art that such embodiments are provided by way of example only. Numerous variations, changes, and substitutions may occur to those skilled in the art without departing from the present disclosure. It should be understood that various alternatives to the embodiments described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

Overview

The present disclosure is directed to systems and methods for robotic navigation, teaching, and mapping. The robotic systems may comprise robots or machines that are capable of cleaning, disinfecting, sanitizing, transporting items, inspecting, monitoring or providing surveillance of an area or an environment. The robots or machines may be configured to operate autonomously or semi-autonomously to clean an area or environment.

Advantages of the methods and systems described herein include the use of initialization objects (for initializing the robot position and/or a robotic operation) that can be repositioned or moved within an environment for subsequent operations of the robot, without affecting or requiring an update to be made to a map of the environment. The present disclosure also provides methods of determining an area for the robot to perform a task or tasks (e.g. a cleaning area) in an environment, by projecting training trajectories and sensor data onto a map, and expanding the training trajectories based on a location of one or more unoccupied grids. The navigation, teaching and mapping systems and methods disclosed herein can be applied to a variety of robotic systems and many different types of environments, for one or more end applications which may include a cleaning task or operation.

Robot/Machine

In an aspect, the present disclosure provides a system comprising a robot or a machine. In some embodiments, a machine may comprise an autonomous, semi-autonomous, and/or non-autonomous robot or machine. In some embodiments, a robot may comprise an autonomous, semi-autonomous, and/or non-autonomous machine or robot. In some embodiments, a robot may be referred to interchangeably as a machine, and a machine may be referred to interchangeably as a robot. In some cases, a robot may be equivalent to a machine, and vice versa. Alternatively, a robot may comprise a system that is capable of operating autonomously or semi-autonomously, and a machine may comprise a non-autonomous system that is capable of being operated by a human or another machine or robot.

In some embodiments, the robots or machines may comprise a cleaning machine or robot (e.g., a floor scrubber or a vacuum). In other embodiments, the robots or machines may comprise, for example, a non-autonomous, semi-autonomous, or autonomous vehicle, a rover, a drone, or a shuttle for transporting humans or objects. In some cases, the robots or machines may comprise a humanoid robot or a non-humanoid robot.

In any of the embodiments described herein, the one or more robots or machines may be configured to operate individually or collectively as a fleet or a swarm of robots or machines. The term "fleet" as used herein may refer to any grouping or collection of a plurality of robots or other machines that are independently or jointly controllable by a human or a computer system. The fleet may comprise one or more robots and/or one or more machines. The one or more robots and/or the one or more machines may comprise a non-autonomous, semi-autonomous, or autonomous robot or machine that can be controlled either locally or remotely.

The robots and/or machines in the fleet may be controlled by a human operator and/or a computer. In any of the embodiments described herein, a fleet may comprise a combination of robots and/or machines. In any of the embodiments described herein, a fleet may comprise a combination of autonomous, semi-autonomous, and/or non-autonomous robots and/or machines.

In some embodiments, the robots or machines may comprise a non-autonomous robot or machine. Such non-autonomous robot or machine may not or need not comprise or have autonomous navigation functions or capabilities. In some cases, such non-autonomous robot or machine may be configured to operate based on one or more inputs, commands, or instructions provided by a human operator. The one or more inputs, commands, or instructions may comprise a physical motion to move the robot or machine, an auditory communication, or a virtual input or selection of an action or movement to be performed by the robot or machine.

FIG. 1 illustrates an example of a robot 100 in accordance with some embodiments. The robot 100 may be configured to perform one or more tasks or operations. In some instances, a task may comprise a cleaning task, and the robot can be configured to execute a cleaning routine or a cleaning operation. The cleaning routine or a cleaning operation may involve using an instrument, a tool, or a substance (e.g., water and/or detergent) or any of these combination to clean, sanitize, or disinfect an area or a region.

In some embodiments, the robot 100 may comprise a navigation subsystem 110. The navigation subsystem 110 can be configured to provide or manage a control logic used by the robot to navigate an environment, for teaching the robot to clean the environment, and/or to execute a cleaning operation or procedure.

In some embodiments, the robot 100 may comprise one or more sensors 112. The sensors 112 may be used to obtain measurements associated with an operation of the robot (or any components or subsystem thereof), the environment in which the robots operates, or the obstacles around the robot. In some cases, the robot may use the measurements obtained using the one or more sensors 112 to control or adjust robot operation (e.g., navigation of the robot through an environment, teaching of the robot to clean an environment, or operation of one or more components or subsystems of the robot).

In some embodiments, the robot 100 may comprise a processor 150. The processor 150 may be configured to control an operation of the robot (or any components or subsystem thereof) based on the measurements or readings obtained using the one or more sensors 112. In some cases, the processor 150 may be operatively coupled to the sensors 112 and/or various other components or subsystems of the robot 100 to aid in (1) processing of sensor data and (2) controlling an operation or a behavior of the robot 100 or various components/subsystems of the robot 100. The processor, in combination with the navigation subsystem and the sensors, can be used to execute instructions for performing or implementing any of the methods disclosed herein.

Figure 2:
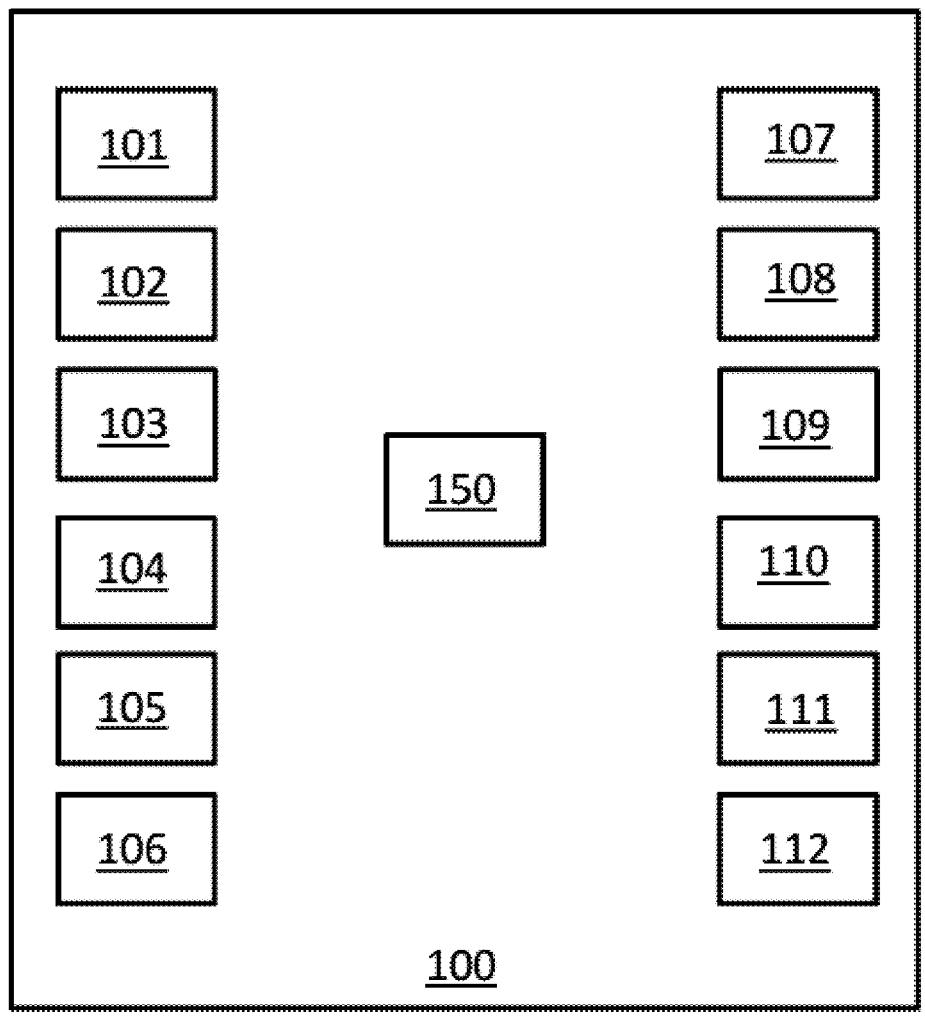
FIG. 2 schematically illustrates a cleaning robot, in accordance with some embodiments.

FIG. 2 illustrates an example of the robot 100 comprising additional subsystems or components. The robot 100 in FIG. 2 may be a cleaning robot.

Referring to FIG. 2, in some embodiments, the robot 100 may comprise a drive unit 101. The drive unit 101 may comprise, for example, wheels, rollers, conveyor belts, treads, magnets, and the like.

In some embodiments, the robot 100 may comprise one or more brushes 102. The brushes 102 may be operated to clean an environment. The brushes 102 may be rotatable to capture dirt, dust, debris, waste materials, particles and/or dirty water. In some cases, the brushes 102 may comprise a scrubber, cleaning blade and/or squeegee.

In some embodiments, the robot 100 may comprise a hopper 103. The hopper 103 may be configured to collect garbage from a brush or scrubber that is proximal to the hopper 103.

In some embodiments, the robot 100 may comprise a tank 104. The tank 104 may comprise a solution tank and a waste water tank. The solution tank may contain either (a) cleaning solution (e.g. clean water with detergent added) or (b) clean water. In some cases, the cleaning machine may be configured to automatically mix detergent and clean water to produce a cleaning solution that can be applied to the floor. In some cases, the solution tank can be manually filled by a user with a pre-mixed cleaning solution. In other cases, the solution tank can be manually filled by a user with clean water and detergent separately, which can then be mixed to produce a cleaning solution. In some embodiments, the solution in the solution tank may be sprayed onto the rolling brush and/or the side brushes for cleaning the ground. In some embodiments, a negative pressure can be applied to collect the waste water on the ground back to the waste water tank.

In some embodiments, the robot 100 may comprise a handle 105. The handle 105 may be used to operate, push or carry the robot. In some cases, the handle can be used to engage an operational mode, to control the robot in a selected mode, or to switch between different operational modes.

In some embodiments, the robot 100 may comprise a squeegee 106. The squeegee 106 can be used to clean or remove water residue or water marks from the area being cleaned.

In some embodiments, the robot 100 may comprise a bumper 107. The bumper 107 can be configured to detect a contact (e.g., an impact or a collision) between the robot 100 and one or more objects or personnel or obstacles in a cleaning environment. The bumper 107 can be used to protect the robot 100 or any components of the robot 100 from being damaged.

In some embodiments, the robot 100 may comprise a cleaning detergent distribution subsystem 108. The cleaning detergent distribution subsystem may be configured to provide or release detergent into a water tank 104 of the robot 100. In some cases, the detergent may be provided in a pre-measured dosage within one or more consumable packs, containers, or pods.

In some embodiments, the robot 100 may comprise a treatment or sanitization subsystem 109. The treatment or sanitization subsystem 109 may be configured to perform a treatment operation (e.g., a sanitization operation or a disinfection operation) for one or more components or portions of the robot 100. In some cases, the treatment or sanitization subsystem may be used to treat or sanitize a hazardous or toxic material or any other material that can be harmful to human or animal health.

In some embodiments, the robot 100 may comprise a communications unit 111. The communications unit 111 may comprise a transmitter and/or a receiver for transmitting and/or receiving information or data. The information or data may comprise operational data for the robot, including data of the components of the robot. In some cases, the communications unit 111 may be configured to transmit the information or data to a central server or one or more other robots or machines. In some cases, the communications unit 111 may be configured to receive information or data transmitted to the robot 100 from a central server or one or more other robots or machines.

An example robot configuration

A robot may comprise a chassis and a drive mechanism for moving the robot through an environment. The environment may include, for example one or more target areas to be cleaned by the robot. In some embodiments, the robot may comprise one or more brushes for cleaning one or more objects, surfaces, or regions in the environment. In some embodiments, the robot may comprise one or more sensors for detecting objects in the environment or mapping/visually inspecting the environment. The one or more sensors may be positioned anywhere on the robot in any suitable configuration to allow the robot to intelligently sense obstacles or movement around the robot from multiple directions or perspectives. The placement of the sensors may provide up to a 360 degree coverage for the robot to detect or sense obstacles or movement (e.g., peripheral movement).

In some embodiments, the robot may comprise a gap or opening in the body or chassis of the robot. The robot may comprise one or more sensors (e.g., LIDAR sensors) positioned in the gap or opening in the body or chassis of the robot. In some cases, a sensor (e.g., an optical sensor, a LIDAR sensor, a radar sensor, etc.) may be integrated on a portion of the robot that is provided within or proximal to the gap or opening. In some cases, a sensor that is provided within or proximal to the gap or opening may have a wide horizontal field-of-view. In some cases, the wide horizontal field-of-view may be at least about 180 degrees, 225 degrees, or 270 degrees. In some cases, a sensor that is provided in a middle of the body or chassis of the robot may be able to directly detect objects nearby the robot. In some cases, a sensor may be positioned to have minimal blind spots for the robot.

In some embodiments, the robot may comprise a handle for operating, pushing or carrying the robot. The handle can be used to engage an operational mode, to control the robot in a selected mode, or to switch between different operational modes.

In some embodiments, in an operating state, the brush assembly and the squeegee assembly can be lowered to the ground. In some embodiments, when the handle is opened or lifted, the cleaning machine can be in a manual operation mode. In some embodiments, in the manual operation mode, a cleaning operation or a map constricting operation can be performed. In some embodiments, when the handle is closed, the cleaning machine is in an automatic operation mode.

The handle may be movable between two or more positions. The two or more positions may correspond to different operating modes. In some cases, the handle may be flush with a top surface of the robot. In some cases, the handle may be angled relative to a top surface of the robot. In some cases, the handle may be temporarily locked at a given position to allow an operator to utilize the robot in a desired operating mode without the need to constantly monitor or control the position of the handle relative to the robot.

Examples of use applications

In some embodiments, the robot can be configured to clean an environment. The environment may comprise an indoor environment or an outdoor environment. In some cases, the environment may comprise a combination of one or more indoor environments and one or more outdoor environments. The indoor environment may comprise, for example, a building, an office, a home, a store, or any other space or area that is at least partially enclosed by one or more walls, ceilings, panels, flooring, or other structural elements. The outdoor environment may comprise, for example, any space that is at least partially exposed to the natural elements, including, for example, public spaces, private spaces that are not enclosed by a structural element or component, roadways, terrestrial or aquatic ecosystems, and the like. In some embodiments, the robot may clean or may be configured to clean places such as a retail store, a fast food restaurant, a convenience store, an airport, a railway station, a shopping mall, a commercial building, a super-market, a campus, or a school.

In some embodiments, the robot may be optimized or configured for floor cleaning for commercial use having an area ranging from 100 square feet to 30,000 square feet. In other embodiments, the robot may be optimized or configured for cleaning of areas greater than 30,000 square feet. In an embodiment, the robot may be optimized or configured for cleaning of areas up to about 15,000 square feet.

In embodiments whereby the robot is configured for floor cleaning areas under 10,000 square feet, the robot can service such areas much more effectively and efficiently than (i) large commercial cleaning robots that are unable to maneuver tight spaces nimbly or precisely navigate to or through hard to reach areas, (ii) small household cleaning robots that lack the battery capacity or productivity rate of robots for commercial cleaning applications, and (iii) human operators manually cleaning the areas using mops or buckets.

Figure 3:
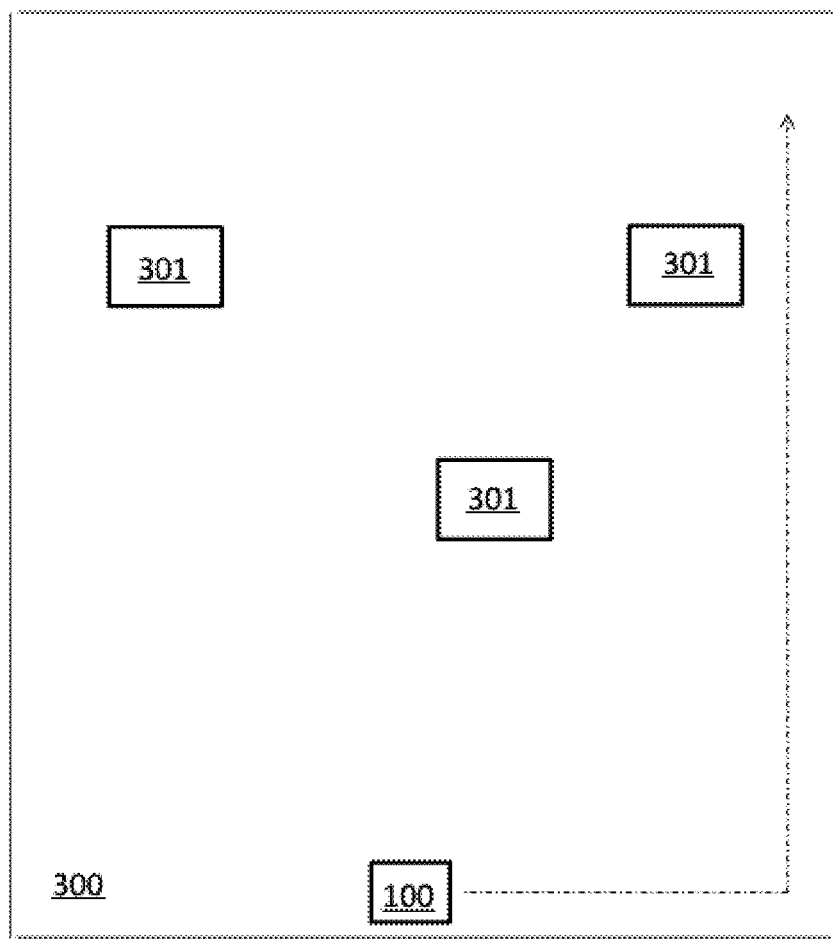
FIG. 3 schematically illustrates an environment comprising obstacles in which a robot may operate, in accordance with some embodiments.
Figure 4:
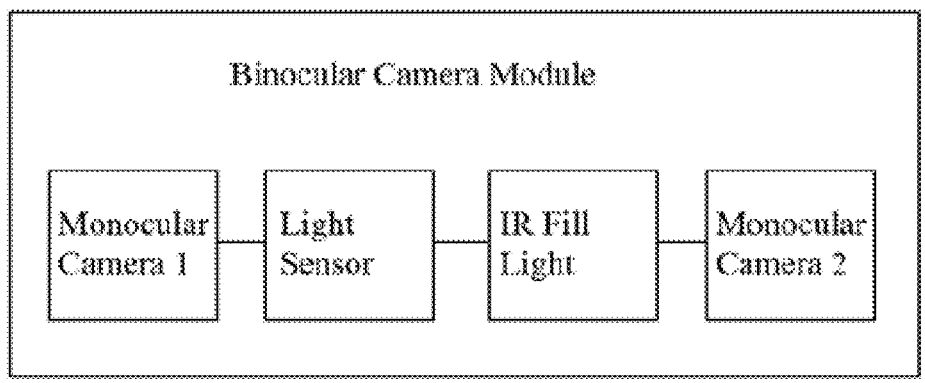
FIG. 4 schematically illustrates a binocular camera module that is used by or mounted on a robot, in accordance with some embodiments.

FIG. 3 illustrates an exemplary environment 300 in which the robot 100 may operate. The environment may comprise one or more obstacles 301 which the robot has to navigate around to avoid collision. In any of the embodiments described herein, the robot may be configured to clean the environment 300 while navigating around the one or more obstacles.

As shown in FIG. 3, the robot may be capable of navigating environment 300 in which a plurality of obstacles 301 are closely positioned or clustered next to each other. The plurality of obstacles may comprise separate and distinct obstacles. Examples of obstacles may include shelves, tables, chairs, equipment or any physical object that may impede a path or trajectory of the robot. In some instances, the plurality of obstacles may comprise different portions, regions, section, or components, of a same object (e.g., different legs of a same chair or table). In any of the embodiments described herein, the robot may have a form factor that allows the robot to navigate around the plurality of obstacles, make tight turns with a minimal turning radius, and maintain a precise cleaning path despite the presence of obstacles along or near the robot's trajectory of motion. The cleaning path may be dynamically adjusted by the robot to account for the particular characteristics or layout of the cleaning environment while taking advantage of the robot's form factor and ability to make tight turns with a minimal turning radius.

Sensors

The systems disclosed herein may comprise one or more sensors. The one or more sensors may comprise one or more vision sensors and/or one or more navigation sensors. The one or more vision sensors may be configured to create a visualization of the robot's surrounding environment, or otherwise simulate or model the surrounding environment based on data obtained using the one or more sensors. The one or more navigation sensors may be used to obtain data that can be used by the robot to navigate a surrounding environment or travel along a path while avoiding obstacles. In some non-limiting embodiments, the one or more sensors may comprise a binocular camera, a radar unit, a time-of-flight (TOF) camera, a LIDAR unit, an ultrasonic or infrared sensor, a cliff sensor that utilizes ultrasonic or infrared waves, an inertial unit (e.g., an inertial measurement unit or IMU), an accelerometer, a velocity sensor, an impact sensor, a position sensor, a GPS, a gyroscope, an encoder, an odometer, or any other type of sensor as described elsewhere herein.

In some embodiments, the one or more sensors may be configured to obtain operational data for a robot or a machine. In some embodiments, the one or more sensors may be configured to obtain data about an environment in which the robot or machine is operating, or one or more objects in the environment. The one or more objects may comprise stationary objects or moving objects.

In some embodiments, the one or more sensors may comprise, for example, a wheel sensor, an encoder, or a clock or a timing unit for measuring machine or component operational time.

In some embodiments, the one or more sensors may comprise a vision sensor (e.g., a computer vision sensor) and/or a navigation sensor. The vision sensor and/or the navigation sensor may comprise a lidar unit, a time of flight (TOF) camera, a binocular vision camera, or an ultrasonic sensor(s). In some cases, a processor that is operatively coupled to the vision sensor and/or the navigation sensor may be configured to reprioritize a robot's route, a machine's route, or a cleaning routine/logic. In some cases, the one or more vision sensors and/or the one or more navigation sensors can be used to detect water on a floor or water remnants/residue, and navigate the robot towards or around the water remnants/residue.

In some embodiments, the one or more sensors may be configured to obtain operational data for a robot or machine. In some embodiments, the operational data may comprise information on a frequency at which one or more treatment or sanitization procedures occur or need to occur. In some cases, the operational data may comprise information on a duration for which treatment or sanitization procedures occur or need to occur.

In some embodiments, the one or more sensors may comprise one or more vision sensors as described above. In some cases, the vision sensors may be configured to detect debris on a floor. In some cases, the vision sensors may be configured to detect the amount or level of water remaining on a floor or a surface.

In some embodiments, the one or more sensors may comprise an impact sensor or an accelerometer as described above. The impact sensor or accelerometer can be used to determine cleaning efficiency, and whether the robot, machine or an operator of the robot or machine has followed an optimal path or cleaning routine (i.e., whether the actual path or cleaning routine used corresponds to a trained or reference path or cleaning routine).

Mapping and navigation

In some embodiments, a method of operating the robot may comprise determining a pose of the robot based at least in part on one or more images of one or more repositionable or movable initialization objects within an environment, and generating a map of the environment in which the robot is configured to move.

The robot may comprise a binocular camera module. The binocular camera module can provide greater accuracy in pose determination compared to the use of a single monocular camera. The binocular camera module may comprise a plurality of monocular cameras, for example two monocular cameras. The plurality of monocular cameras (e.g. a first monocular camera and a second monocular camera) may be separated by a predetermined distance to enable binocular or stereoscopic vision and imaging. In some embodiments, the binocular camera module can comprise an IMU. The binocular camera module having an IMU can implement both a distance measurement (e.g., measuring a distance from the robot to an initialization object) and a pose determination.

Figure 6:
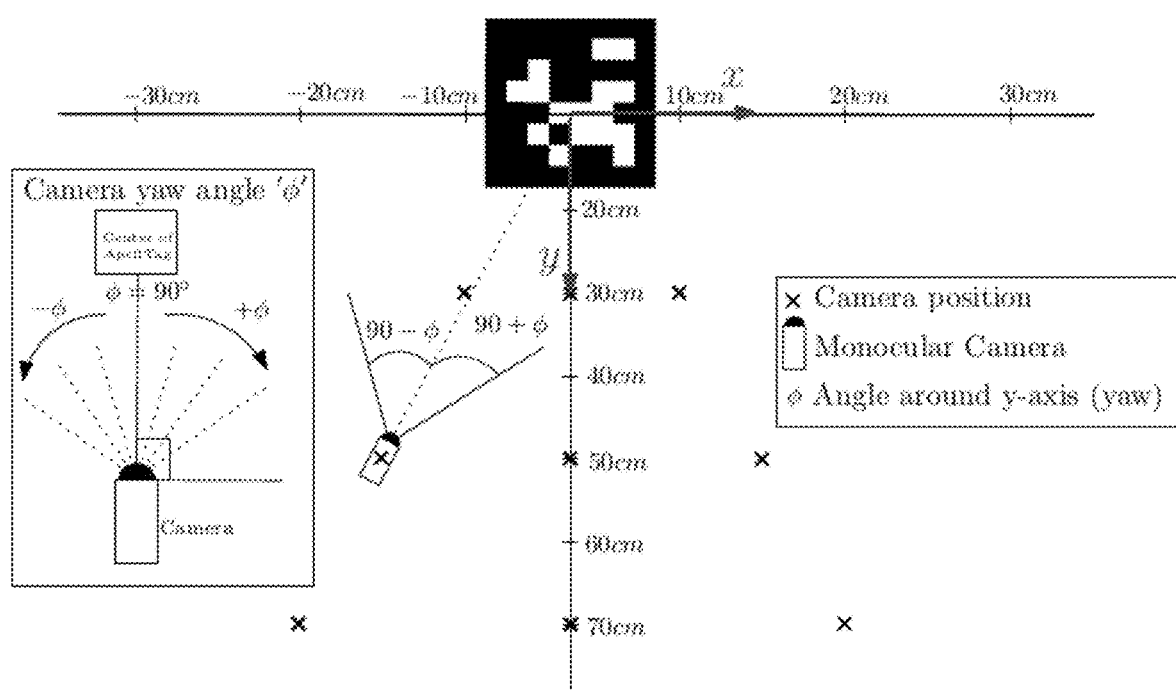
FIG. 6 shows an example of an initialization object that can be used to establish a starting position of the robot for initializing the navigation path of the robot, in accordance with some embodiments.

The one or more initialization objects can be used to establish a starting position of the robot for initializing the robot. The starting position can be obtained by visual recognition of the one or more initialization objects. An initialization object may be referred to interchangeably herein as a marker. A marker comprises a unique identification (ID) and can be used to determine the relative pose (position and attitude angle) between the robot and the marker. The one or more initialization objects may comprise an AprilTag, a quick response (QR) code, a pattern, a checkerboard, a reference marker, ArUco, Charuco, ARtag, CALTAG, and the like. FIG. 6 shows an example of an AprilTag, and FIG. 10(b) shows an example of a checkerboard, that can be used for determining the robot's pose relative to those markers. An initialization object (or marker) can be provided in a variety of formats, such as printed on a material (e.g. a sheet of paper). In some embodiments, an initialization object may be an image displayed on an electronic screen or device.

The map of the environment that is generated may comprise information on (i) an area of the environment that the robot is configured to move in or traverse through to perform one or more tasks or operations, (ii) one or more predetermined paths for the robot to travel, and (iii) the pose of the robot. The map and the one or more predetermined paths may be associated with the initialization objects. In some embodiments, the map of the environment can be generated by generating an occupancy grid map based on sensor data obtained by the robot, and expanding the occupancy grid map as the robot moves through the environment. The occupancy grid map may comprise one or more occupied grids indicating a position or an orientation of an obstacle or a boundary of the environment relative to the robot. The occupancy grid map may comprise one or more occupied grids, unoccupied grids and/or one or more unknown grids. The movement of the robot can be adjusted based on the one or more unoccupied grids. The one or more occupied grids can be localized based on the pose of the robot relative to the obstacle and/or the boundary of the environment. In some instances, the pose of the robot may be updated by matching sensor data obtained by the robot with the map that is generated, or with one or more features or objects within the map.

Figure 7A:
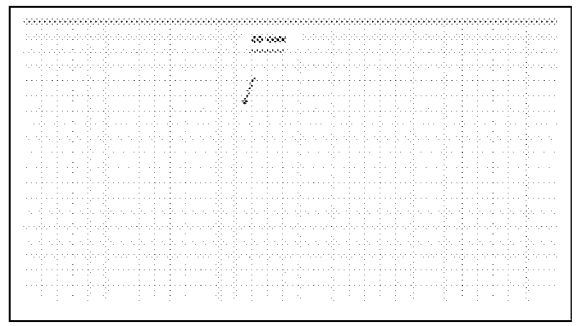
FIGS. 7(a)-7(c) illustrate map and path generation, in accordance with some embodiments.
Figure 7B:
Figure 7C:
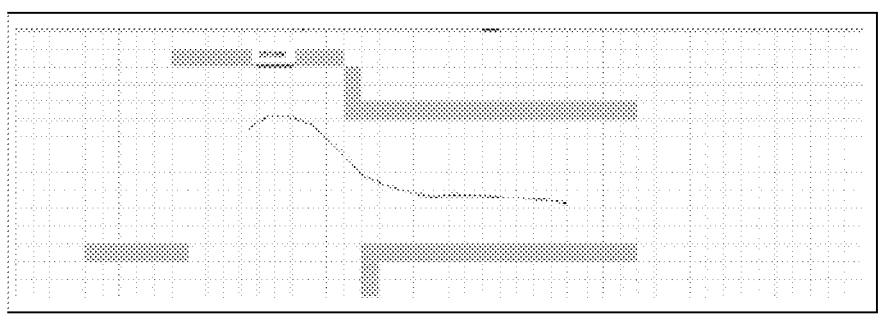

Referring to FIG. 7(a), a blank grid map may be initially generated. Next, the posture of the robot with respect to the marker may be projected onto the blank grid map, the location of the marker serving as an origin point on the map. When the robot is operated, the navigation subsystem can be configured to combine data from various sensors (e.g. LIDAR, IMU, odometer, etc.) to calculate the position of the robot. The positional data of the robot can be automatically projected onto the grid map. Based on the current positional data as well as historical navigation data, the robot calculates a probability of each individual square grid (in proximity to the robot) being occupied by an object (obstacle). If the probability of occupation is high, those square grids are recorded as occupied grids (shaded squares as shown in FIG. 7(b)). Conversely, if the probability of occupation is low, those square grids are recorded as passable grids (nonshaded squares as shown in FIG. 7(b)). In some embodiments, as the robot moves closer to an edge of the grid map, the grid map can be expanded in the direction which the robot is moving towards (for example as shown in FIG. 7(c)).

In some embodiments, when the robot is moving along at least a portion of the one or more predetermined paths, a loopback detection may be triggered when the robot is in proximity to a location that the robot has previously passed through. The loopback detection can cause the robot to adjust its trajectory and re-align with the one or more predetermined paths.

Figure 9A:
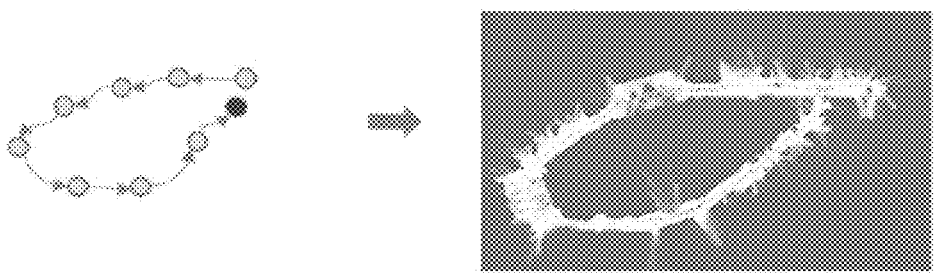
FIGS. 9(a) and 9(b) illustrate a loopback detection and/or a map correction, in accordance with some embodiments.
Figure 9B:
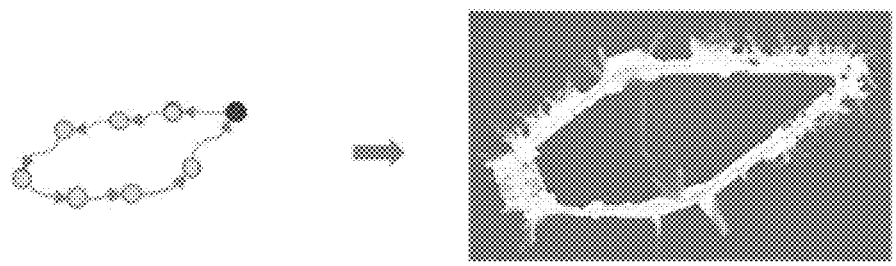

In some embodiments, the navigation subsystem can be configured to perform correction using SLAM loopback detection. For example, the robot may comprise a LIDAR that is continuously collecting data about the surrounding environment. The LIDAR sensor data can be fused with other sensor data (e.g. vision/image data, odometer, IMU, etc.) to estimate a position of the robot. When the robot moves to (or is in proximity to) an area that it has previously passed through, the robot can be configured to perform a loopback detection and/or a map correction, for example as shown in FIGS. 9(a) and 9(b). The map correction can comprise correcting the map and the path/trajectory of the robot, based on a difference between the estimated position of the robot and a target position of the robot.

Once the map construction is completed, the map data can be stored on the robot and/or on a remote server. The map construction described above and elsewhere herein need not require merging of existing maps, since it is based on auto-population of a grid map starting from a blank grid with an origin point, and expanding the grid map as the robot moves within the environment.

In some embodiments, the robot may be operated by initiating or controlling a movement of the robot along at least a portion of the one or more predetermined paths to perform one or more tasks or operations. The robot can be configured to move along different trajectories or traverse different areas within the environment based on a task or an operation performed by the robot. In some embodiments, the one or more tasks or operations may comprise a cleaning task.

Figure 8A:
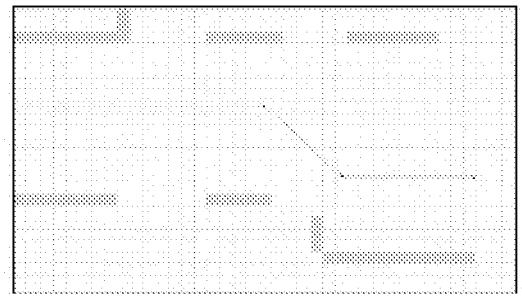
FIGS. 8(a)-8(c) illustrate map and path generation, and automatic path adjustment for obstacle avoidance, in accordance with some embodiments.
Figure 8B:
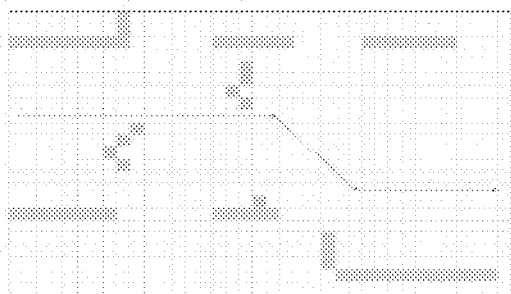
Figure 8C:
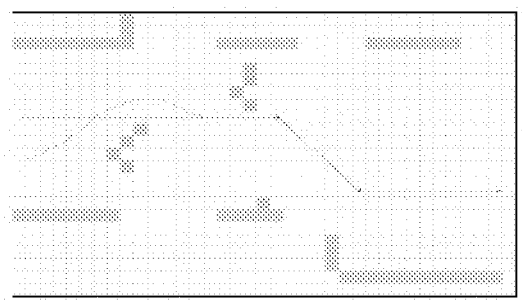

In some embodiments, path planning and robot training can be based on path decision learning. Environmental information, a desired path of the robot, and a map of the environment can be recorded or generated during a path planning stage. If the robot is used for a cleaning task, the planned path and environment map can be loaded when the robot automatic cleaning operation is activated. Referring to FIG. 8(a), obstacle information can be collected from sensor data (e.g. LIDAR, TOF sensor, binocular camera, etc.) and projected onto the environment map based on local and relative positions between the different sensors on the robot. Next, a point on the path of the robot can be selected (e.g., a point close to the robot) as a target point, and the current position of the robot can be used as a starting point to plan an operable path through the environment while avoiding obstacles. See, e.g. FIG. 8(b). The robot can be configured to move automatically along the planned path to perform the cleaning task. If the robot senses obstacles that are located close to or along the planned path, the robot can be configured to automatically adjust its path to increase clearance and avoid those obstacles, for example as shown in FIG. 8(c).

Figure 10A:
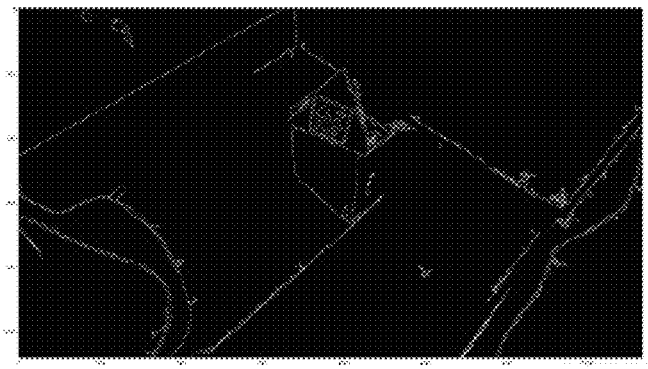
FIGS. 10(a) and 10(b) illustrate examples of visual codes or markers that can be used for robot positioning.
Figure 10B:
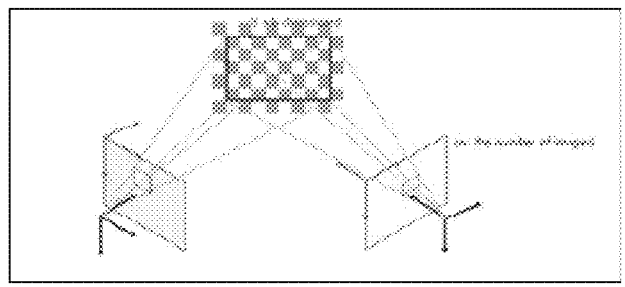
Figure 10C:
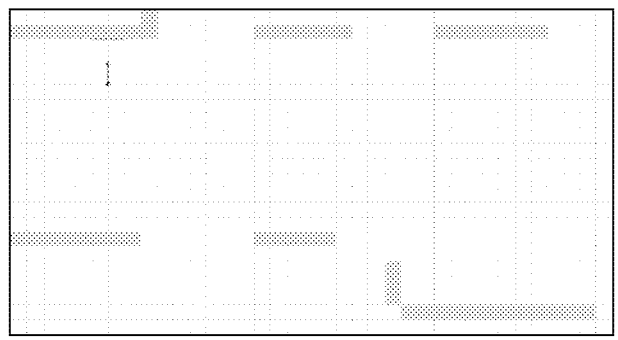
FIG. 10(c) illustrates the projection of robot location onto a grid map based on marker location, in accordance with some embodiments.

FIGS. 10(a) and 10(b) illustrate examples of visual codes or markers that can be used for robot positioning. Referring to FIG. 10(b), an image of the marker can be captured by an imaging sensor on the robot, for example the binocular camera module described elsewhere herein. The marker can be detected using a software, for example AprilTag machine vision software, and the position of each corner point in the image can be determined. Next, a relative posture of each monocular camera (e.g. left-eye camera and right-eye camera) in the binocular camera module with respect to the marker can be calculated based on the corner points, for example using OpenCV PNP. Given that the position of the binocular camera module mounted on the robot is known, the relative posture of each monocular camera with respect to the marker can be converted/transformed to a relative posture of the robot with respect to the marker. Next, the robot location can be projected onto a grid map, based on the marker location that has been recorded to the grid map, for example as shown in FIG. 10(c).

The marker (e.g. AprilTag) can be used to establish and determine an origin of a world coordinate system. In creating a map, once the robot detects a marker using the binocular camera module, the robot can establish the origin of world coordinate system with the position of the marker. If the marker is placed on a wall of a building, the coordinate system can be established to be approximately consistent with the structure of the building, which can provide technical advantages in reducing the amount of memory storage and for displaying graphics (since the structure/layout of the building is generally known).

The marker can be used to mark an area in which the robot is located, which provides an initial and approximate positioning of the robot. Next, the surrounding environment can be scanned using sensors (e.g. LIDAR and vision sensors) mounted on the robot, and the surrounding environment can be matched with the sensed environment which was recorded when creating the map, so as to provide precise positioning. Accordingly, the marker can be used as a reference for repositioning the robot, and for providing initial coarse positioning. The trajectory and actions of the robot are recorded on the map, but need not be bound with or constrained by the position of the marker. For example, if the position of the marker changes or is moved to a different location, the robot remains capable of automatically operating within the target area and planned route. Additionally, positioning errors do not accumulate even if the robot and the marker were to be separated by a substantial distance (e.g. greater than 1 m) at the start of the position initialization step. This is in contrast to other conventional robotic navigation systems, which may require a robot to be in close proximity (e.g. less than 0.1 m) to the marker during the position initialization step (otherwise errors may accumulate thereby resulting in route inaccuracies).

Accordingly, a trajectory of the robot along the one or more predetermined paths or a portion thereof may be independent of a location of the one or more initialization objects within the environment. In other words, the initialization objects need not always have to be at fixed locations, and they can be repositioned or moved within the environment without affecting the operation or the trajectory of the robot. The initialization object (e.g. marker) described herein can be used as a reference for a starting point and an ending point of a path. The map that is generated need not be linked/associated to the marker. For example, once a map is generated using a marker as the starting point and ending point, the map does not change or "shift" even if the marker were to be moved to another location in the map. The aforementioned feature is advantageous because in many instances, markers are not allowed to be affixed permanently (for example, to a wall in public places or buildings). To avoid affixing to the walls of buildings, the marker can be provided for example on a movable board (e.g., poster stand). For robot cleaning tasks/operations, once a map has been generated using the marker as reference point, the movable board can be removed until the next cleaning cycle (which may be the next day or another different time within the same day). At the next cleaning cycle, the movable board with the marker need not have to be placed in the same location/position as before. As long as the movable board with the marker is placed anywhere along the planned cleaning path, the map that is already generated will not shift or change (even though the movable board with the marker is no longer in the same position as when it was used for map generation).

Figure 11A:
FIGS. 11(a) and 11(b) illustrate the use of image signals as instructions for robot operations, behaviors and tasks, in accordance with some embodiments.
Figure 11B:
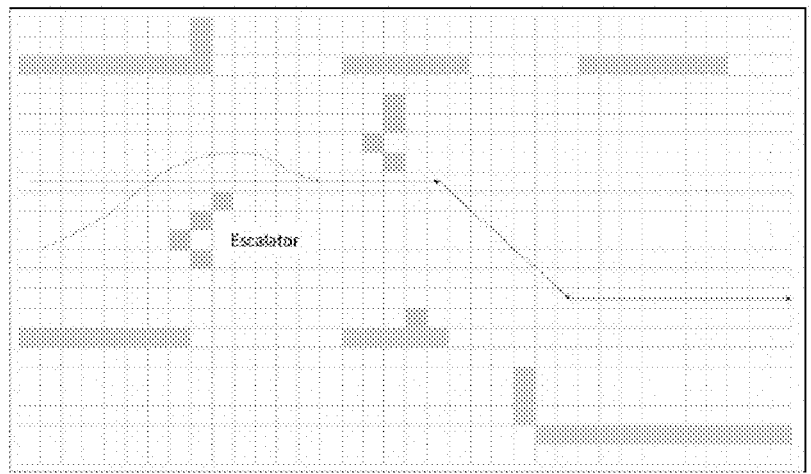

FIGS. 11(a) and 11(b) illustrate the use of image signals as instructions for robot operations, behaviors and tasks, in accordance with some embodiments. The robot can be configured to collect images of the surrounding environment. Machine vision can be used to correct the actions/behavior of the robot, such as pedestrian avoidance, elevator avoidance, etc. For example, if the robot visually detects a pedestrian, the navigation subsystem can calculate a relative position of the pedestrian and the robot, and guide the robot to slow down, bypass or send out an audio signal of avoidance. As another example, if the robot visually detects an escalator, the navigation subsystem can calculate a relative position of the escalator and the robot, guide the robot to bypass, and determine whether the operating environment poses a risk to the robot's operation.

In some embodiments, an initialization object or marker may comprise a planar checkerboard pattern having a repeating pattern of black squares alternating with white squares. Each of the squares can be identically sized and arranged in a grid having a plurality of rows and columns. In some embodiments, the corner points of the squares can serve as feature points for performing camera calibration. Corner points may be relatively easy to distinguish from other portions of the image data using machine vision techniques (e.g. AprilTag). Alternatively, other portions of the checkerboard can serve as features for calibration purposes (e.g., black squares or white squares, etc.). The marker features can be identified using various feature extraction techniques, and the image coordinates of each feature determined. This process can be facilitated by knowledge of the geometry of the checkerboard. For example, in embodiments where the corner points of the checkerboard squares serve as feature points of the marker, the size of the squares defines the spacing between neighboring feature points. The image coordinates of each corner point can thus be determined based on its row and column position within the checkerboard.

Once the image coordinates of the features in the marker have been determined, the correspondence between the image coordinates and the world coordinates of the features on the marker can then be identified. The world coordinate system can be defined relative to the marker, such that the world coordinates of each feature correspond to the position of the feature on the marker.

The binocular camera module disclosed herein can comprise a left-eye monocular camera that is configured to capture a first image of the marker, and a right-eye monocular camera that is configured to capture a second image of the marker. The correspondence between image coordinates of the features (e.g., corner points) in the first image, image coordinates of corresponding features in the second image, and the world coordinates of the features in the marker can be identified and used to determine the pose of the robot.

Low light conditions

In some embodiments, the binocular camera module may further comprise a light sensor and an infrared light source. The light sensor can be configured to detect environmental illuminance. The robot can be configured to activate the light sensor to detect environmental illuminance when (i) the initialization objects are not initially detected or (ii) only one or a subset of the plurality of monocular cameras detects the initialization objects. The robot can be configured to activate the infrared light source in a low illumination or dark environment, after which the binocular camera module can be used to detect the initialization objects or obtain the one or more images of the initialization objects.

In some embodiments, the robot can be configured to adjust an exposure time or a gain of the binocular camera module when the light sensor detects an over-exposure of light. Conversely, the robot can be configured to activate the infrared light source and/or adjust an illuminance of the infrared light source if the light sensor detects an under-exposure of light. The illuminance of the infrared light source can have an adjustable range of between 0 and 100. In some embodiments, the binocular camera module can be configured to make an initial attempt to detect the initialization objects using a low illuminance level. If the binocular camera module is unable to detect the initialization objects, the illuminance can be increased incrementally until the binocular camera module is able to detect the initialization objects.

Pose validation

In some embodiments, an Infinitesimal Plane-based Pose Estimation (IPPE) algorithm can be used to verify or validate an accuracy of the pose of the robot. In other embodiments, a PNP (Perspective-n-Point) algorithm can be used to verify or validate pose accuracy by solving for perspective projection from 3D (three-dimensional) to 2D (two-dimensional). In some instances, movement of the robot is initiated when the accuracy of the robot pose is within a predetermined threshold or range. If the accuracy of the robot pose lies outside of the predetermined threshold or range, the robot may not operate or move, and the initialization step may need to repeat in order to achieve a pose accuracy within the predetermined threshold or range.

IMU with TOF sensor

A time of flight (TOF) sensor can be used to detect low altitude obstacles for obstacle recognition and avoidance. However, the accuracy of a standalone TOF sensor may be low if the TOF sensor is not accurately installed on a predetermined location on the robot.

Figure 5:
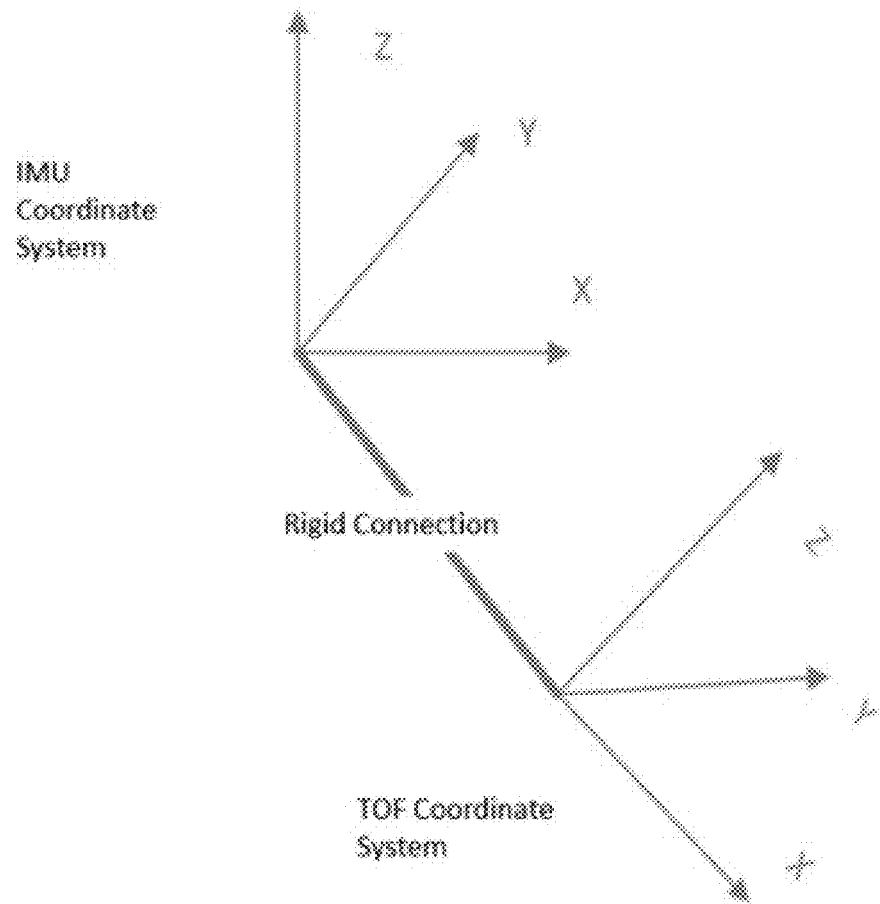
FIG. 5 schematically illustrates the coordinate systems of an IMU and a TOF sensor that are rigidly coupled together, in accordance with some embodiments.

To compensate for the above shortcoming and to improve detection accuracy, the robot disclosed herein may comprise an inertial measurement unit (IMU) and a time of flight (TOF) sensor. The IMU may comprise a 3-axis accelerometer and a 3-axis gyroscope. The IMU and the TOF sensor may be rigidly coupled to each other. The IMU and the TOF sensor may be calibrated relative to each other. A self-calibration process can be performed at regular intervals to compensate for loss error or sensor drift. The IMU can be configured to detect motion and vibration characteristics of the TOF sensor. FIG. 5 illustrates the IMU and TOF coordinate systems which are fixed relative to each other, due to the rigid coupling between the IMU and the TOF sensor.

The IMU and the TOF sensor can be used to aid in a navigation or a movement of the robot through the environment. For example, the IMU can be configured to detect an acceleration, a velocity, and/or an attitude of the robot or the TOF sensor in real time in 3-dimensional (3D) space. A frequency of detection can be up to 500 Hz (IMU frequency 1000 Hz), which permits dynamic detection of the robot body and real-time attitude detection by the IMU.

The TOF sensor can be configured to detect or recognize one or more objects or obstacles. The IMU can be configured to compensate for one or more errors in one or more measurements obtained using the TOF sensor. Based on dynamic information from the IMU, the TOF information can be compensated in both distance domain as well as frequency domain. The distance domain refers to the dynamic amplitude. The frequency domain refers to noise caused by the TOF transmission by Doppler effect due to vibration of the robot body.

In some instances, experimental results for the above IMU and TOF sensor combination have shown detection accuracy rates of over 80% (for objects having a size of 4×4×4 cm$^3$) and over 99% (for objects having a size of 6×6×6 cm$^3$). The above assumes a tolerance of the angles between the TOF sensor and the ground, the roll and yaw angles of the TOF sensor, the roll and yaw angles of the binocular camera, are all controlled within ±1 degree.

Teaching mode, auto-fill mode, and map partition

In some cases, a user can define, via a human-computer interaction interface, one or more boundaries of an area to be cleaned on a map. A cleaning robot can be configured to perform an autonomous path planning in the area constrained by the boundary, and can complete the cleaning task according to the planned path. In some instances, the robot may be unable to completely distinguish the area to be cleaned, for example due to limited detection capability of sensors and/or the presence of complex or complex-shaped obstacle boundaries.

To overcome at least the above challenges, a robot as disclosed herein may comprise one or more sensors that are configured to detect one or more obstacles in or near an environment as the robot traverses or moves along one or more training trajectories through the environment. The robot can be configured to determine a cleaning area in the environment by (i) projecting the one or more training trajectories and sensor data obtained using the one or more sensors onto a map and (ii) expanding the one or more training trajectories based on a location of one or more unoccupied grids in the map. The map may comprise (i) one or more obstacle areas comprising the one or more obstacles detected by the robot and (ii) one or more transitable areas comprising the one or more training trajectories. In some embodiments, the map may comprise an occupancy grid. The cleaning area may comprise the one or more training trajectories and is free of the one or more obstacles detected using the one or more sensors. The one or more training trajectories may define or span a portion of the potential cleaning area.

The sensor data may indicate a position or an orientation of the one or more obstacles. In some embodiments, the robot can be configured to capture the sensor data while the robot is manually pushed along the one or more training trajectories. The robot can be configured to register or record one or more coordinates for the one or more boundaries on the map as the robot is manually pushed along the one or more training trajectories.

In some other alternative embodiments, the robot can be configured to capture the sensor data while the robot is autonomously moving, or remotely controlled to move, along the one or more training trajectories. In some embodiments, the one or more boundaries for the one or more target areas may be designated by a user or an operator of the robot. Additionally or optionally, the one or more boundaries for the one or more target areas may be designated by personnel associated with the target areas, for example a business operator, floor manager, etc. In certain embodiments, the one or more boundaries for the one or more target areas may be automatically designated by a software program/algorithm that is designed to optimize or maximize a floor area/space to be cleaned.

The robot can be configured to identify one or more target areas to clean within the cleaning area based on a designation of one or more boundaries for the one or more target areas. The one or more boundaries can be recorded by the robot as the robot traverses or moves along the one or more boundaries. The one or more target areas can be identified by excluding an area in the environment in which the one or more obstacles are located. In some embodiments, the one or more target areas can be identified by excluding an additional area in the environment that is proximal or adjacent to the area in which the one or more obstacles are located. The additional area may extend for a predefined distance (e.g., ranging from 1 cm to 50 cm) outward from the area in which the one or more obstacles are located. The exclusion of the additional area can be advantageous to reduce the risk of the robot colliding with the one or more obstacles, particularly if the obstacles are densely packed or have complex shapes/sizes.

Once the target areas to be cleaned have been identified, the robot can be configured to move or navigate along one or more cleaning paths through or within the one or more target areas, to clean the one or more target areas or a portion thereof. The robot can be configured to clean the one or more target areas while avoiding one or more obstacle areas (comprising the one or more obstacles that are/were detected by the robot).

In some embodiments, the target areas may comprise two or more target areas designated by two or more distinct boundaries. In some embodiments, the two or more target areas may be merged into a combined target area for the robot to clean. Conversely, in other embodiments, the robot can be configured to partition the target area into two or more sub-areas for cleaning. In some cases, the robot can be configured to expand the one or more training trajectories based on the sensor data obtained by the robot. The one or more expanded trajectories may permit the robot to traverse a path that extends beyond the one or more training trajectories. In some embodiments, the robot can be configured to adjust or expand the one or more training trajectories based on a processing of the sensor data using artificial intelligence (AI) or a machine learning (ML) algorithm. Examples of machine learning algorithms can include a support vector machine (SVM), a naïve Bayes classification, a random forest, a neural network, deep learning, or other supervised learning algorithms or unsupervised learning algorithms. The machine learning algorithms can be trained using one or more training datasets.

FIGS. 12(a)-12(e) and FIGS. 13(a)-13(c) illustrate examples of robot teaching and boundary delineation, for determining one or more target areas to be cleaned. In some embodiments, the teaching and boundary delineation may be performed by a user manually pushing a robot along one or more training trajectories. In other embodiments, the teaching and boundary delineation may be performed semi-automatically by a user remotely controlling the robot to move along one or more training trajectories. In some alternative embodiments, the teaching and boundary delineation may be performed automatically as the robot autonomously moves along the one or more training trajectories. After the one or more target cleaning areas have been determined, the robot can be configured to move/traverse through the target area(s) in one or more modes (e.g. spiral mode and/or zig-zag) to ensure that the target area(s) are properly cleaned.

Figure 12A:
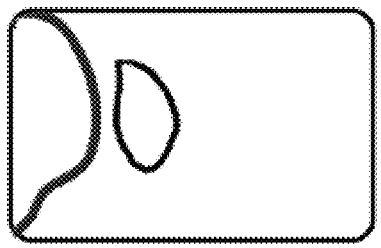
FIGS. 12(a)-12(e) and FIGS. 13(a)-13(c) illustrate examples of robot teaching and boundary delineation for determining one or more target areas to be cleaned, in accordance with some embodiments.

During a teaching step, the robot is moved along one or more training trajectories (for example, by a user manually pushing a robot through an environment to be cleaned). The sensors onboard the robot (e.g. infrared sensor, ultrasonic sensor, collision sensor, odometer, camera, LIDAR, TOF sensor, etc.) can sense the environment during the teaching. The sensor data can be projected to a 2-dimensional (2D) grid map, for example as shown in FIG. 12(a). The grid map may include obstacle areas (i.e. areas that the robot is unable to pass through) and transitable areas (i.e. areas that the robot can pass through). Each grid in the grid map may be assigned with a value (e.g., 0 to 255), whereby the value indicates a probability that the grid is occupied. For example, a grid value in an obstacle area can be set as 254, and a grid value in a transitable area can be set as 0.

Figure 12D:
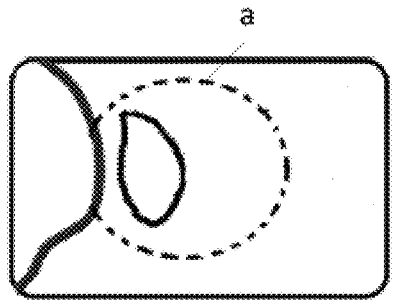
Figure 12B:
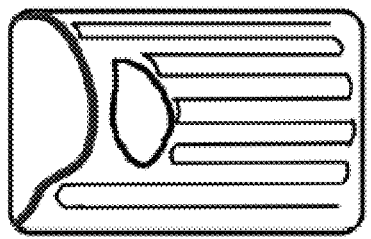
Figure 12E:
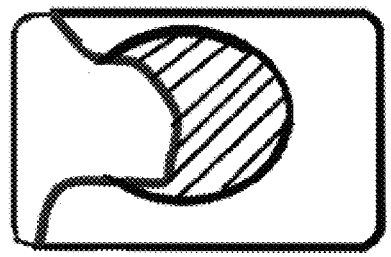

FIG. 12(b) illustrates a taught trajectory for the robot to avoid the obstacle areas. The taught trajectory may correspond to the one or more training trajectories for teaching the robot. A position table List-1 can be generated. During the teaching step, the coordinates of each grid on the taught trajectory can be recorded in the position table List-1 in the order which the robot is moved/traversed. The position table List-1 may be bound to the grid map.

Figure 12C:
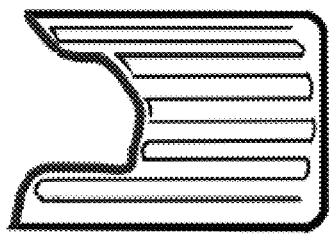

Next, the taught trajectory can be expanded based on the grid map and the position table List-1 to obtain a maximum coverage/cleaning area. For example, each path within the trajectory can be expanded by a predetermined number of grids to obtain the area to be cleaned, as shown in FIG. 12(c). Referring to FIG. 12(c), the expanded area can completely cover/encompass the taught trajectory while excluding the obstacle area. Accordingly, the expanded area may correspond to the maximum coverage area that the robot is able to clean. The information associated with the maximum coverage area can be imported into a newly generated Map-1, in which the grid values within the maximum coverage area are 0.

Next, the robot can be moved (e.g. manually pushed by a user) to specify/delineate a cleaning boundary in the target area. The delineated boundary points can be recorded. As shown in FIG. 12(d), the dotted line a may correspond to the boundary of the target area to be cleaned. The coordinates of the points along the boundary a can be recorded in another position table List-2. The boundary and the area enclosed by the boundary can next be imported into a newly generated map Map-2, where the grid values of the imported data in Map-2 are set to 1.

Next, to obtain the area to be cleaned, a new map Map-3 can be generated. Map-1 (maximum coverage area, in which the grid value is 0) and Map-2 (area enclosed by the boundary, in which the grid value is 1) are imported into Map-3. The area in Map-3 where the grid value is 1 corresponds to the target area to be cleaned (which is depicted by the shaded area in FIG. 12(e)).

In some embodiments, two or more cleaning boundaries can be specified/delineated for a target area. The robot can be moved (e.g. manually pushed by a user, remotely controlled by a user, or autonomously moved) to delineate the two or more cleaning boundaries. For example, referring to FIG. 13(a), a first boundary a and a second boundary b can be delineated by moving the robot to define those boundaries. The first boundary a may be the same as boundary a previously described and shown in FIG. 12(d). The coordinates of the first boundary a can be recorded in a position table List-A (which is similar to or same as List-2 described with reference to FIG. 12(d)). The second boundary b may be an additional new boundary, and its coordinates can be recorded in a position table List-B. Next, the first and second boundaries (a and b) and the areas enclosed by both boundaries can be imported into a new generated map Map-A. The grid value of the imported data in Map-A can be set to 1. Next, a new map Map-4 can be generated. Map-1 as previously obtained (maximum coverage area, in which the grid value is 0) and Map-A (areas enclosed by the boundaries, in which the grid value is 1) can be imported into Map-4. Accordingly, the area in Map-4 in which the grid value is set as 1, may correspond to the final area to be cleaned, for example as shown by the shaded area in FIG. 13(b).

In some embodiments, a target area can be partitioned into two or more sub-areas for cleaning. This can be advantageous to improve cleaning efficiency, especially if the target area has a complex shape or contour. A target area having a complex shape or contour can be partitioned into two or more sub-areas that have simpler shapes or contours. In some embodiments, the order of cleaning those sub-areas by the robot can be defined, for example to optimize the cleaning path from one sub-area to a next sub-area, and/or based on a priority level of each sub-area to be cleaned.

Figure 13A:
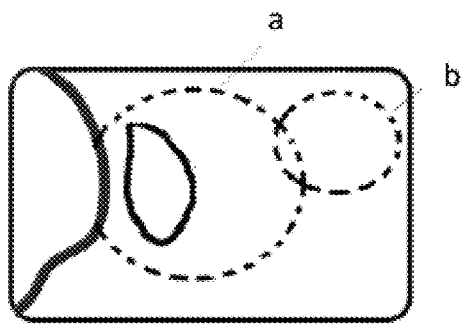
Figure 13B:
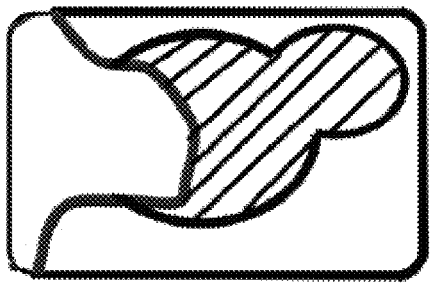
Figure 13C:
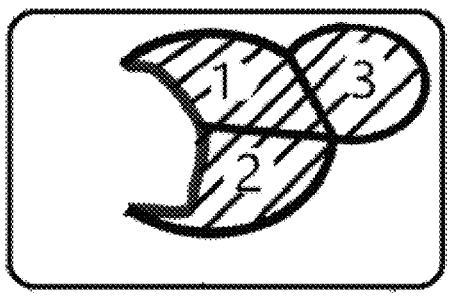

Referring to FIG. 13(c), the target area to be cleaned has a relatively complex shape or contour. Accordingly, the target area can be partitioned into a plurality of sub-areas (e.g. sub-areas 1, 2 and 3) which have less complex shapes or contours. A partitioning algorithm can be used to automatically partition the target area to be cleaned into two or more sub-areas. In some embodiments, the partitioning algorithm may be a boustrophedon cellular decomposition algorithm. The sub-areas may have an order to be cleaned. For example, in FIG. 13(c), the robot can be configured to clean sub-area 1 first, followed by sub-area 2, and finally sub-area 3. As previously mentioned, the order of cleaning can be based, for example on optimizing the cleaning path from one sub-area to a next sub-area, and/or based on a priority level of each sub-area to be cleaned.

Figure 14A:
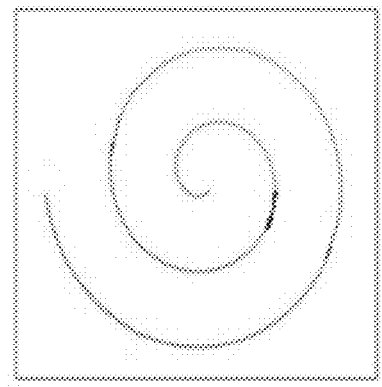
FIG. 14(a) shows a spiral cleaning path and FIG. 14(b) shows a zig-zag cleaning path, in accordance with some embodiments.
Figure 14B:
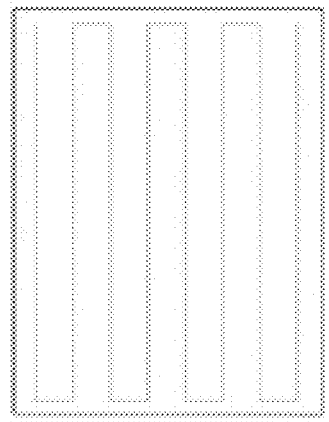

After a target area to be cleaned (or two or more sub-areas that are to be cleaned) have been determined, a cleaning path within the target area can be automatically generated for the robot. The cleaning path can have any number of configurations. For example, FIG. 14(a) shows a spiral cleaning path, and FIG. 14(b) shows a zig-zag cleaning path. A cleaning path may be in a single configuration, or may have two or more configurations. In some embodiments, a cleaning path may have a combination of both spiral and zig-zag cleaning paths. The type of path configuration may be determined based on a type of area to be cleaned, and/or a type of cleaning robot. For example, certain areas may be more efficiently cleaned using a spiral path, whereas other areas may be more efficiently cleaned using a zig-zag path. Likewise, some cleaning robots can be customized to travel in a spiral manner, while other cleaning robots are more well-suited to travel in a zig-zag manner.

Mapping based on user input (operation of robot handle)

In some embodiments, the robot may be autonomously operated based at least partially on a map. The map may be constructed using a mapping method. The map may be constructed based at least partially on a user input. In some embodiments, the user input may comprise pushing the robot using a handle. In some embodiments, a mapping method may comprise using a simultaneous localization and mapping (SLAM) or visual SLAM (VSLAM) method. In some embodiments, a mapping method may comprise using sensor data from one or more sensors. In some embodiments, the one or more sensors may be disposed on the robot as described elsewhere herein. In some embodiments, the one or more sensors may be fused. In some embodiments, the mapping method may comprise calculating a movement trajectory and/or position information of the robot.

In some embodiments, the mapping method may comprise opening a handle of the robot. In some embodiments, the mapping method may comprise scanning a position calibration code using a vision sensor and/or a navigation sensor. In some embodiments, the calibration code may comprise a QR code or a barcode. In some embodiments, the mapping method may comprise pushing the handle. In some embodiments, pushing the handle may initiate calculation of a trajectory and/or position information of the robot. In some embodiments, the calculation may be based at least partially on data (e.g., VSLAM data) collected through one or more vision and/or one or more navigation sensors configured or implemented for SLAM or VSLAM applications. In some embodiments, the method may comprise releasing the handle. In some embodiments, the method may comprise scanning the position calibration code a second time. In some embodiments, scanning the position calibration code the second time saves the map on a digital storage device.

Scannable objects and map sharing

In some embodiments, a method may comprise providing (i) a plurality of robots and (ii) one or more scannable objects associated with one or more maps of an environment, and (b) deploying the plurality of robots in the environment to perform one or more tasks. The maps of the environment can be generated using any of the systems and methods described elsewhere herein. The scannable objects can be repositionable or movable within the environment, without affecting or having to update the maps of the environment that have been generated.

In some embodiments, the method may comprise providing the one or more maps to the plurality of robots when the plurality of robots register or image the one or more scannable objects. The one or more maps may comprise a plurality of different maps. The plurality of different maps can be provided to different robots among the plurality of robots. The plurality of different maps may comprise different trajectories for different robots. The plurality of different maps may correspond to different regions or subareas of the environment. The plurality of robots can be configured to share the one or more maps of the environment.

The scannable objects may include, or may correspond to the one or more repositionable or movable initialization objects (or markers) described elsewhere herein. The scannable objects may be associated with or affixable to one or more physical objects or surfaces in an environment to be cleaned or navigated. In some cases, the scannable objects may comprise a bar code, a quick response (QR) code, an AprilTag, a unique identifier, or a serial number.

The scannable objects may be scanned by a robot. In some embodiments, the scannable objects may be used to facilitate a cleaning operation. Based on the scanning, a robot may initiate a cleaning procedure or move along a predetermined route. A plurality of robots can be configured to navigate through the environment using the one or more maps in order to perform the one or more tasks. The tasks can include, for example one or more cleaning tasks as described elsewhere herein. In some embodiments, the plurality of robots can be configured to collectively perform the one or more tasks. In other embodiments, the plurality of robots can be configured to each independently or individually perform the one or more tasks.

Motion Paths

In some cases, the operation of the one or more robots or machines may be adjusted based on the operational data obtained for the one or more robots or machines. In some cases, one or more motion paths or cleaning routines assigned to the one or more robots or machines may be adjusted based on the operational data. In some cases, the operation of the one or more robots or machines may be adjusted based on a detected change or deviation in expected robot or machine behavior or performance.

Operational Data

The operational data of one or more robots or machines in a fleet may be gathered or obtained using one or more sensors of the one or more robots or machines. In some cases, the one or more sensors may comprise one or more vision sensors and/or one or more navigation sensors as described elsewhere herein. In some cases, the one or more sensors may comprise a position sensor, a GPS unit, an encoder, an odometer, an accelerometer, an inertial measurement unit (IMU), a gyroscope, or a velocity sensor. In some cases, the one or more sensors may comprise, for example, a temperature sensor, a pressure sensor, a humidity sensor, or any other type of environmental sensor for sensing the conditions of the environment in which the one or more robots or machines are being operated. In some cases, the one or more sensors may comprise an optical sensor or a vision sensor as described elsewhere herein. The optical sensor or vision sensor may comprise, for example, an imaging sensor or a camera. In some cases, the one or more sensors may comprise a lidar sensor, a vision sensor, a time of flight sensor (e.g., a 3D time of flight sensor), a binocular vision sensor, a stereoscopic vision sensor, or an ultrasound sensor.

In some embodiments, the operational data may be received from a single robot and/or machine or from multiple robots and/or machines. In some cases, the operational data may be received from multiple robots and/or machine in series or sequentially. Alternatively, the operational data may be received from multiple robots and/or machines simultaneously or concurrently. As described above, the robots and/or machines may comprise autonomous, semi-autonomous, and/or non-autonomous robots or machines, or any combination thereof Any combination of robots and/or machines, including autonomous, semi-autonomous, and non-autonomous machines or robots, can be used together to implement the systems and methods of the present disclosure.

In some cases, the operational data may comprise information on a geographical location of the one or more robots or machines. In some cases, the operational data may comprise information on a position, an orientation, or a pose of the one or more robots or machines. In some cases, the operational data may comprise information on a spatial distribution of the one or more robots or machines across an area or an environment.

In some cases, the operational data may comprise information on a battery level or a charge status of the one or more robots or machines and/or the one or more components of the one or more robots or machines. The battery level or charge status may indicate how long the robot or machine has been in operation, and how long the robot or machine may continue operating before losing power.

In some cases, the operational data may comprise fault information or alarm information for the one or more robots or machines and/or the one or more components of the one or more robots or machines. In some cases, the fault information may be generated automatically by the one or more robots or machines. In some cases, the fault information may be manually reported or generated by a user or an operator of the one or more robots or machines.

In some cases, the operational data may comprise information on work records, a cleaning path, or a cleaning performance for the one or more robots or machines. In some cases, the operational data may comprise information on a total time of use or operation for the one or more components.

In any of the embodiments described herein, the operational data may be periodically generated or compiled by the one or more robots or machines for transmission or upload to the central server. In any of the embodiments described herein, the operational data may be transmitted from the one or more robots or machines to the central server at one or more predetermined or periodic time intervals. In any of the embodiments described herein, the operational data may be transmitted from the one or more robots or machines to the central server at one or more time intervals that vary according to a historical usage or a total operational time of the one or more robots or machines.

In some embodiments, the operational data may be obtained using a float sensor. In some cases, the float sensor can indicate a full waste water tank and alert a user that the tank needs to be changed. In some cases, the float sensor can indicate an empty solution tank and alert a user that the tank needs to re-filled.

In some embodiments, the operational data may comprise information on an operational time of the robot or machine. The information on the operational time of the robot or machine can be used to determine when to activate a treatment or sanitization subsystem as described elsewhere herein. In some cases, the information on the operational time of the robot or machine can be used to alert or inform a user as to when the user should initiate a treatment or sanitization procedure (e.g., to sanitize or clean a component or subsystem of the robot or machine, or to disinfect a harmful substance or byproduct that is generated or built up over time as the robot or machine performs one or more cleaning operations).

In some embodiments, the operational data may comprise information on a frequency at which treatment or sanitization procedures occur or need to occur. In some cases, the operational data may comprise information on a duration for which treatment or sanitization procedures occur or need to occur. In some cases, the frequency information and/or the duration information may indicate how much or how often cleaning is performed over time.

In some embodiments, the cleaning data or information can be used to identify water spots or other spots that may require additional cleaning, and to change the operation of the machine or the components of the machine to optimize cleaning performance. In some cases, the cleaning data or information may comprise information on environmental factors associated with an operating environment of the robot or machine. The environmental factors may include, for example, temperature, humidity, or area of operation. In some cases, for example in colder climates, the robot or machine may automatically adjust its operation or movement to operate slower, increase vacuum power, and/or increase water flow.

Fleet of Robots

Figure 15:
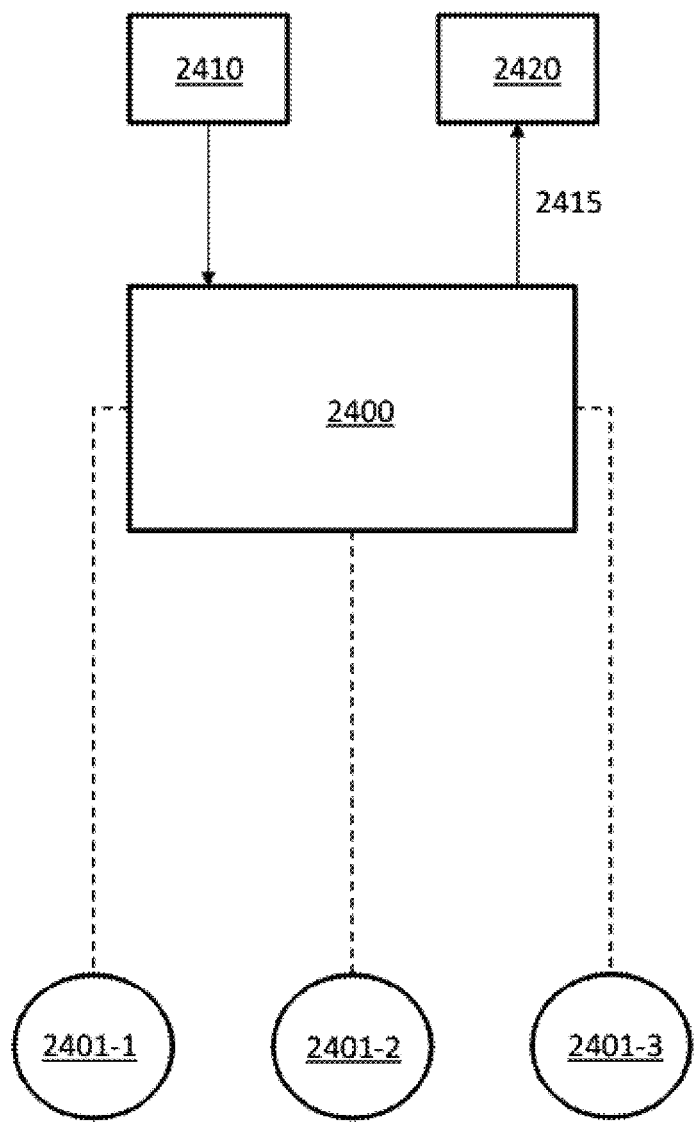
FIG. 15 schematically illustrates a plurality of robots and/or machines in communication with a central server, in accordance with some embodiments.

FIG. 15 schematically illustrates a central server 2400 and a plurality of robots and/or machines 2401-1, 2401-2, and 2401-3 that are in communication with the central server 2400. In some cases, the central server 2400 may be configured to receive operational data from the plurality of robots and/or machines 2401-1, 2401-2, and 2401-3. The plurality of robots and/or machines 2401-1, 2401-2, and 2401-3 may be in communication with each other. Alternatively, the plurality of robots and/or machines 2401-1, 2401-2, and 2401-3 may not or need not be in communication with each other.

The plurality of robots and/or machines 2401-1, 2401-2, and 2401-3 may each comprise one or more sensors. The one or more sensors may be used to capture the operational data associated with the operation or the status of the plurality of robots and/or machines 2401-1, 2401-2, and 2401-3.

The central server 2400 may be configured to process the operational data. In some embodiments, the central server 2400 may be configured to compare the operational data to one or more reference values or thresholds associated with the operation or the status of the one or more robots or machines or one or more components of the one or more robots or machines. In some cases, the central server 2400 may be configured to receive the one or more reference values or thresholds from a memory module 2410. The central server 2400 may be configured to detect one or more changes or deviations in operation or expected behavior for the one or more robots or machines or the one or more components of the one or more robots or machines based at least in part on the comparison of the operational data to the one or more reference values or thresholds. The central server 2400 may be configured to generate one or more reports or update an operational logic for the one or more robots or machines based on the detected changes or deviations, or based on one or more metrics computed using the operational data received from the one or more robots or machines.

In some embodiments, the central server 2400 may be configured to generate and transmit one or more reports 2415 to one or more entities 2420. The one or more entities 2420 may comprise an operator or an administrator of the one or more robots or machines. The one or more reports 2415 may comprise one or more metrics associated with an operation of the one or more robots or machines.

Platform/i-SYNERGY

In some cases, the systems and methods of the present disclosure may be implemented using a platform for collecting and processing operational data of one or more robots or machines. The operational data of each robot or machine in a fleet may be transmitted to a central server or platform, which may be configured to collect and process the operational data. The operational data (and/or any other information that can be derived from the processing of the operational data) may be transmitted to one or more end user interfaces or portals to facilitate the monitoring and control of robot or machine operation. In some cases, the central server or platform may comprise an IoT platform that synergizes the management of multiple cleaning robots or machines in a fleet based on operational data obtained from one or more robots or machines in the fleet.

In some cases, the platform may comprise a cloud server that is in communication with one or more robots or machines via a wireless communication network. The cloud server may be operatively coupled to a plurality of robots or machines that are configured to operate in an environment. In some cases, the environment may be an indoor environment that supports wireless communications.

In some cases, the cleaning robots or machines may be in communication with a cloud server via a network. The network may permit a transmission of data between (i) a service provider or a cloud server and (ii) the cleaning robots or machines. The service provider or cloud server may be configured to process data received from the robots or machines. The service provider or cloud server may be configured to monitor or control an operation of the robots or machines based on the operational data received from the robots or machines. In some cases, the service provider or cloud server may be configured to provide one or more reports, alerts, and/or notifications to a user or an operator of the robots or machines based on the operational data received from the robots or machines. The one or more notifications may indicate, for example, that a change or deviation in expected robot or machine performance or behavior has been detected, or that a variance in a planned motion logic of the robot or machine has been identified. In some cases, the service provider or cloud server may interface with a mobile application or a web application to facilitate tracking of cleaning, robot or machine operation, and/or the processing of fleet information and/or operational data.

Computer Systems

Figure 16:
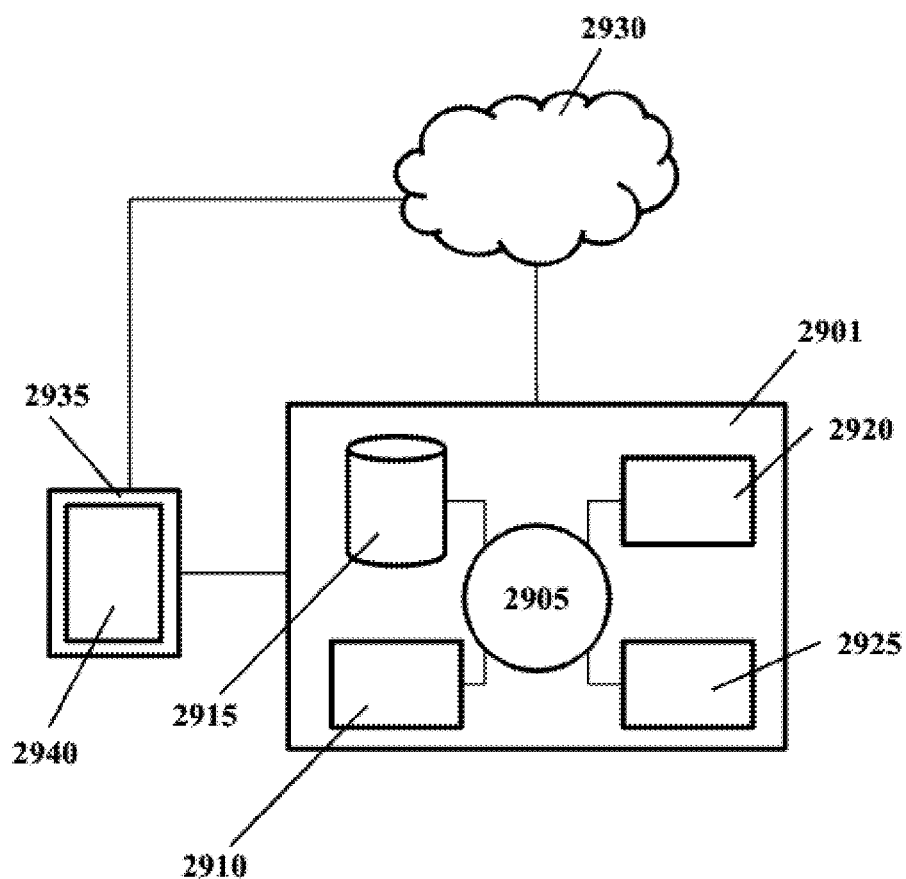
FIG. 16 schematically illustrates a computer system that is programmed or otherwise configured to implement any of the methods provided herein.

In an aspect, the present disclosure provides computer systems that are programmed or otherwise configured to implement methods of the disclosure, e.g., any of the subject methods for robotic cleaning. Referring to FIG. 16, a computer system 2901 may be programmed or otherwise configured to implement a method for cleaning an environment. The computer system 2901 may be configured to, for example, control a robot to execute a cleaning procedure or operation based on a user input, prior training or teaching, or a decision made by the robot based on sensor readings and/or using artificial intelligence or machine learning. The computer system 2901 can be an electronic device of a user or a computer system that is remotely located with respect to the electronic device. The electronic device can be a mobile electronic device.

The computer system 2901 may include a central processing unit (CPU, also "processor" and "computer processor" herein) 2905, which can be a single core or multi core processor, or a plurality of processors for parallel processing. The computer system 2901 also includes memory or memory location 2910 (e.g., random-access memory, read-only memory, flash memory), electronic storage unit 2915 (e.g., hard disk), communication interface 2920 (e.g., network adapter) for communicating with one or more other systems, and peripheral devices 2925, such as cache, other memory, data storage and/or electronic display adapters. The memory 2910, storage unit 2915, interface 2920 and peripheral devices 2925 are in communication with the CPU 2905 through a communication bus (solid lines), such as a motherboard. The storage unit 2915 can be a data storage unit (or data repository) for storing data. The computer system 2901 can be operatively coupled to a computer network ("network") 2930 with the aid of the communication interface 2920. The network 2930 can be the Internet, an internet and/or extranet, or an intranet and/or extranet that is in communication with the Internet. The network 2930 in some cases is a telecommunication and/or data network. The network 2930 can include one or more computer servers, which can enable distributed computing, such as cloud computing. The network 2930, in some cases with the aid of the computer system 2901, can implement a peer-to-peer network, which may enable devices coupled to the computer system 2901 to behave as a client or a server.

The CPU 2905 can execute a sequence of machine-readable instructions, which can be embodied in a program or software. The instructions may be stored in a memory location, such as the memory 2910. The instructions can be directed to the CPU 2905, which can subsequently program or otherwise configure the CPU 2905 to implement methods of the present disclosure. Examples of operations performed by the CPU 2905 can include fetch, decode, execute, and writeback.

The CPU 2905 can be part of a circuit, such as an integrated circuit. One or more other components of the system 2901 can be included in the circuit. In some cases, the circuit is an application specific integrated circuit (ASIC).

The storage unit 2915 can store files, such as drivers, libraries and saved programs. The storage unit 2915 can store user data, e.g., user preferences and user programs. The computer system 2901 in some cases can include one or more additional data storage units that are located external to the computer system 2901 (e.g., on a remote server that is in communication with the computer system 2901 through an intranet or the Internet).

The computer system 2901 can communicate with one or more remote computer systems through the network 2930. For instance, the computer system 2901 can communicate with a remote computer system of a user (e.g., an operator or an administrator of a robot or a machine). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 2901 via the network 2930.

Methods as described herein can be implemented by way of machine (e.g., computer processor) executable code stored on an electronic storage location of the computer system 2901, such as, for example, on the memory 2910 or electronic storage unit 2915. The machine executable or machine readable code can be provided in the form of software. During use, the code can be executed by the processor 2905. In some cases, the code can be retrieved from the storage unit 2915 and stored on the memory 2910 for ready access by the processor 2905. In some situations, the electronic storage unit 2915 can be precluded, and machine-executable instructions are stored on memory 2910.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 2901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 2901 can include or be in communication with an electronic display 2935 that comprises a user interface (UI) 2940 for providing, for example, a portal for a user or an operator to monitor or control an operation of one or more robots or machines. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 2905. For example, the algorithm may be configured to control a robot to execute a cleaning procedure or operation based on a user input, prior training or teaching, or a decision made by the robot based on sensor readings and/or using artificial intelligence or machine learning.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for robotic navigation, teaching and mapping, comprising:
    (a) determining a pose of the robot based at least in part on one or more images of an initialization object within an environment, wherein the initialization object serves as a starting point of a navigation path that the robot is configured to move in or traverse;
    (b) generating a map of the environment in which the robot is configured to move, wherein the map comprises information on (i) an area of the environment that the robot is configured to move in or traverse through to perform one or more tasks or operations, (ii) the navigation path as determined by a method selected from the group consisting of a teaching method and an auto-fill method, and (iii) the pose of the robot, wherein the map and the navigation path are associated with the initialization object, wherein the teaching method includes manually moving the robot to generate the navigation path that the robot is configured to traverse, and wherein the auto-fill method includes manually moving the robot in the environment to construct boundaries within the map, and the navigation path is determined based at least in part on the boundaries; and
    (c) controlling a movement of the robot along at least a portion of the navigation path to perform the one or more tasks or operations, wherein the one or more tasks or operations comprise a cleaning task.

2. The method of claim 1, wherein a trajectory of the robot along the navigation path or a portion thereof is independent of a location of the initialization object within the environment.

3. The method of claim 1, further comprising updating the pose of the robot by matching sensor data obtained by the robot with the map generated in (b) or one or more features or objects within the map.

4. The method of claim 1, wherein the initialization comprises a quick response (QR) code, an April tag, a pattern, a checkerboard, or a reference marker.

5. The method of claim 1, wherein in (b), the map of the environment is generated by:
    a. generating an occupancy grid map based on sensor data obtained by the robot; and
    b. expanding the occupancy grid map as the robot moves through the environment, wherein the occupancy grid map comprises one or more occupied grids indicating a position or an orientation of an obstacle or the boundaries of the environment relative to the robot.

6. The method of claim 5, wherein the occupancy grid map comprises one or more occupied grids, unoccupied grids and/or one or more unknown grids.

7. The method of claim 5, wherein the movement of the robot is adjusted based on the one or more unoccupied grids.

8. The method of claim 5, wherein the one or more occupied grids are localized based on the pose of the robot relative to the obstacle or the boundaries of the environment.

9. The method of claim 1, further comprising, subsequent to (c), triggering a loopback detection when the robot is in proximity to a location that the robot has previously passed through, wherein the loopback detection causes the robot to adjust its trajectory and re-align with the navigation path.

10. The method of claim 1, wherein the robot comprises a binocular camera module.

11. The method of claim 10, wherein the binocular camera module comprises a plurality of monocular cameras, an infrared light source, and a light sensor.

12. The method of claim 11, wherein the plurality of monocular cameras are separated by a predetermined distance to enable binocular or stereoscopic vision and imaging.

13. The method of claim 10, wherein the binocular camera module is configured to detect and/or identify the initialization object.

14. The method of claim 11, wherein the light sensor is configured to detect environmental illuminance, and wherein the robot is configured to activate the infrared light source in a low illumination or dark environment.

15. The method of claim 11, wherein (a) further comprises using the binocular camera module to detect the initialization object or obtain the one or more images of the initialization object.

16. The method of claim 15, wherein the robot is configured to activate the light sensor to detect environmental illuminance when (i) the initialization object are not initially detected or (ii) only one or a subset of the plurality of monocular cameras detects the initialization object.

17. The method of claim 16, wherein the robot is configured to adjust an exposure time or a gain of the binocular camera module when the light sensor detects an over-exposure of light.

18. The method of claim 16, wherein the robot is configured to activate the infrared light source and/or adjust an illuminance of the infrared light source if the light sensor detects an under-exposure of light.

19. The method of claim 1, further comprising, subsequent to (a), using an Infinitesimal Plane-based Pose Estimation (IPPE) algorithm to verify or validate an accuracy of the pose of the robot.

20. The method of claim 1, wherein in (c), the movement of the robot is initiated when the accuracy of the robot pose is within a predetermined threshold or range.

21. The method of claim 1, wherein the robot comprises an inertial measurement unit (IMU) and a time of flight (TOF) sensor.

22. The method of claim 21, wherein the IMU and the TOF sensor are rigidly coupled to each other.

23. The method of claim 21, wherein the IMU and the TOF sensor are calibrated relative to each other.

24. The method of claim 21, further comprising using the IMU and the TOF sensor to aid in a navigation or a movement of the robot through the environment.

25. The method of claim 24, further comprising using the IMU to detect an acceleration, a velocity, and/or an attitude of the robot or the TOF sensor in real time.

26. The method of claim 21, further comprising using the TOF sensor to detect or recognize one or more objects or obstacles.

27. The method of claim 26, further comprising using the IMU to compensate for one or more errors in one or more measurements obtained using the TOF sensor.

28. The method of claim 21, further comprising using the IMU and the TOF sensor to perform the one or more tasks or operations.

29. The method of claim 1, wherein the robot is configured to move along different trajectories or traverse different areas within the environment based on a task or an operation performed by the robot.

* * * * *